United States Patent [19]

Rhodes

[11] Patent Number: 5,730,872
[45] Date of Patent: Mar. 24, 1998

[54] APPARATUS FOR SEPARATING A MIXTURE OF LIQUIDS

[76] Inventor: Laurence Mark Rhodes, 11825 Grande Vista Dr., Whittier, Calif. 90601

[21] Appl. No.: 644,241

[22] Filed: May 10, 1996

[51] Int. Cl.$^6$ .................................................. C02F 1/40
[52] U.S. Cl. ..................... 210/519; 210/532.1; 210/540; 210/DIG. 5
[58] Field of Search ............................. 210/519, 521, 210/532.1, 538, 540, DIG. 5

[56] References Cited

U.S. PATENT DOCUMENTS

| | | | |
|---|---|---|---|
| 612,791 | 10/1898 | Winkel | 210/540 |
| 665,841 | 1/1901 | Winkel | 210/519 |
| 762,486 | 6/1904 | McClelland | 210/519 |
| 782,665 | 2/1905 | Shaler | 210/540 |
| 2,285,893 | 6/1942 | Boosey | 210/519 |
| 2,755,933 | 7/1956 | Profit | 210/538 |
| 2,878,944 | 3/1959 | Barnes | 210/540 |
| 3,844,743 | 10/1974 | Jones | 210/DIG. 5 |
| 4,011,158 | 3/1977 | Cook | 210/DIG. 5 |
| 4,422,931 | 12/1983 | Wolde-Michael | 210/519 |
| 4,722,800 | 2/1988 | Aymong | 210/802 |
| 4,869,236 | 9/1989 | Blough | 210/540 |
| 5,286,383 | 2/1994 | Verret et al. | 210/540 |

FOREIGN PATENT DOCUMENTS 56-15807  2/1981  Japan .

OTHER PUBLICATIONS

Hangsterfer's CPS Jr. Tramp Oil Removal System advertisement; Feb. 1994 (4 pp.).
Great Lakes Environmental Slant Rib Coalescing Oil/Water Separator advertisement; GLE Bulletin 100.89; 1989 (4 pp.).
CLC Lubricants Co., Product Information. Publication re: Li'L Tramp Skimmer/Aerator; (known to the public before Jan. 1, 1996).
ITW Fluid Products Group, Rustlick SC3000 Coolant Skimmer advertisement, p. 8.
Midbrook Products, Inc., Mini–Extractor advertisement; 1993; 1995 (3 pp.).
Master Chemical Corporation, Master Coalescer advertisement; 1992 (2 pp.).

*Primary Examiner*—Christopher Upton
*Attorney, Agent, or Firm*—Christie, Parker & Hale, LLP

[57] ABSTRACT

A separator for a mixture of two liquids of different density. A container holds the mixture, which separates by gravity into a layer of lighter liquid on a layer of heavier liquid in the container. The mixture is supplied through a delivery pipe which extends from above the layer of lighter liquid down into the heavier liquid. Lighter liquid is removed through a line which includes a ball valve to provide a variable weir for controlling flow of lighter liquid from a first outlet. Heavier liquid is removed from a second outlet through an upwardly extending drain pipe connected at its lower end to the second outlet. The upper end of the drain pipe is in the vicinity of the interface between the two layers. A riser pipe disposed around and spaced from the drain pipe has an open upper end disposed above the layer of lighter liquid, and a lower end opening into the heavier liquid. A pile of loose coalescing elements in the container between the delivery pipe and the lower end of the riser pipe causes small oil drops to coalesce into larger drops. At least one outwardly extending flange on the container facilitates mounting the separator in a workspace.

10 Claims, 6 Drawing Sheets

FIG. 7
FIG. 8
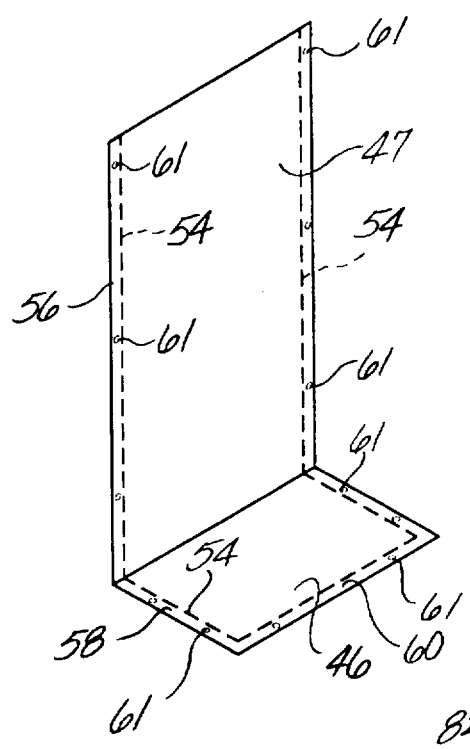
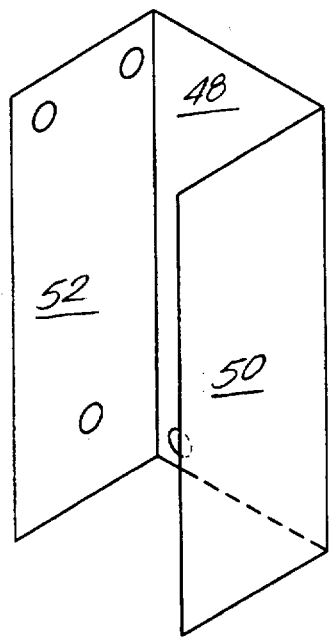
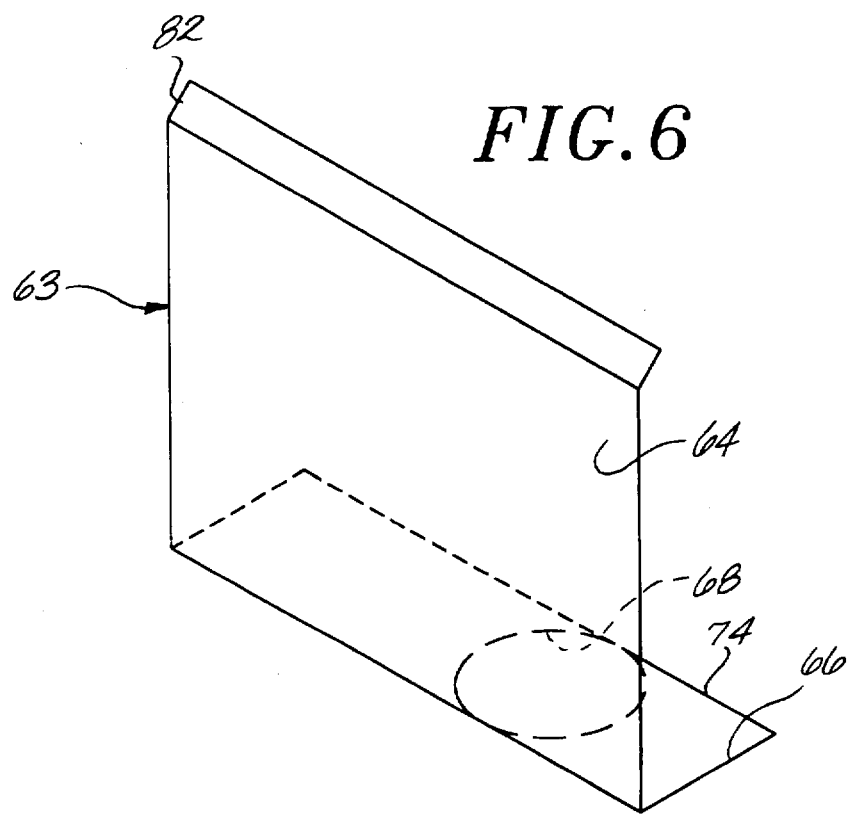
FIG. 6

APPARATUS FOR SEPARATING A MIXTURE OF LIQUIDS

This invention relates to apparatus for separating a mixture of liquids of different densities.

The invention can be used to separate any mixture of liquids which separate under gravity, but it is especially useful in treating water containing extraneous material, such as oil, grease, and solid particles.

"Tramp" oils (hydraulic oils, lubricating oil for mills, lathes, and drill presses, transmission oil, and any other undesirable oil) are a source of many problems associated with water used in industrial parts washers, and with water-based coolants (which include a water-miscible organic lubricant) used in machining and grinding operations. The coolants are designed primarily to lubricate and cool the work and the cutting or grinding surfaces of the machine doing the work. The coolants reduce heat build-up during the machining or grinding process, and prevent the burning of parts, reduce distortion in the workpiece, extend tool life, and permit faster production.

Machine coolants include oils, emulsifiers, and water-soluble oils to combine the lubrication property of cutting oils with the cooling ability and economy of water. The machine coolants are fairly expensive and, therefore, are recirculated for various machining operations. Water used in industrial parts washers is also recirculated to reduce costs. Coolants and wash water pick up various amounts of tramp oil during machining, grinding, or washing operations.

Most coolant formulations will absorb tramp oil if the two materials are permitted to remain in intimate contact for a sufficient length of time. Absorbed tramp oil will change the desirable properties of the coolants, negatively affecting tool life, surface finish of workpieces, and skin sensitivity of tool operators. Therefore, it is important to remove tramp oil from coolant formulations promptly to minimize these disadvantages. Prompt and efficient separation of tramp oil from coolant also extends coolant life, improves machining, and minimizes maintenance. It is also important to separate tramp oil from wash water as soon as possible to minimize the amount of water which must be carried in inventory and to save floor space.

A number of separators and skimmers have been developed to separate oil and water mixtures, but most of these are expensive, inefficient, or require a large amount of floor space. Previously available separators are also difficult to adjust and keep adjusted for efficient removal of the separated products for a variety of operating temperatures and materials.

This invention provides a separator which is easy and inexpensive to manufacture, requires little or no floor space (because it is sufficiently compact to be mounted on many pieces of existing equipment), is self-adjusting for various operating conditions, and is easy to adjust for efficient removal of a separated oil phase. The invention also includes an efficient coalescing section which is easily removed, cleaned, and replaced as required.

In brief, this invention provides a separator for a mixture of two liquids of different densities which will separate under the effect of gravity. The separator includes a container with an inlet for supplying the mixture to the container where the mixture separates by gravity into a layer of lighter liquid on a layer of heavier liquid. A first outlet permits removal of the lighter liquid from the container, and a second outlet removes the heavier liquid from the container. Preferably, a permeable pile of loose coalescing elements is disposed in the container between the inlet and second outlet so at least the heavier liquid flows through the pile to facilitate coalescence of small oil drops into larger drops, which separate more quickly from the mixture. A ball valve in the first outlet provides an easily adjusted overflow weir for controlling the flow of the lighter liquid from the container, which preferably has outwardly extending flanges to facilitate mounting the separator on existing equipment.

The preferred form of the invention also includes a delivery pipe in the container and extending down through the layer of lighter liquid and into a trough submerged in the layer of heavier liquid. The mixture of liquids to be separated falls freely into the open upper end of the delivery tube to provide a vacuum breaker effect if the supply of the mixture should be interrupted. The outlet for the heavier liquid is preferably connected to the lower end of an upright drain pipe in the container. The upper end of the drain pipe is open and at a level near that of the interface between the heavier and lighter liquids. An upright riser pipe disposed coaxially around the drain pipe extends from its lower end in the heavier liquid to above the surface of the layer of lighter liquid. Thus, the mixture can be fed into the container and down the delivery tube without disturbing the surface of the lighter liquid, and the heavier liquid can flow by gravity into the upper end of the drain pipe without disturbing the interface between the layers of heavier and lighter liquids.

BRIEF DESCRIPTION OF THE DRAWINGS

These and other aspects of the invention will be more fully understood from the following detailed description, taken in conjunction with the accompanying drawings, in which:

FIG. 6 is a perspective view of an L-shaped baffle used to form the trough submerged in the heavier liquid in the separator;

FIG. 7 is an elevational view of the rear and bottom walls of the separator before assembly; and FIG. 8 is a perspective view of the front, left, and right walls of the separator before assembly.

Referring to FIG. 1, the separator of this invention includes an upright container 20 having an inlet 21 near the upper end of the tank. An inlet line 22 connects the tank inlet 21 to the outlet 23 of a self-priming pump 24, which has an inlet 25 connected by a hose 26 to a skimmer 27, which floats on the surface 28 of an oil/water mixture 30 in a sump tank 32.

Figure 1:
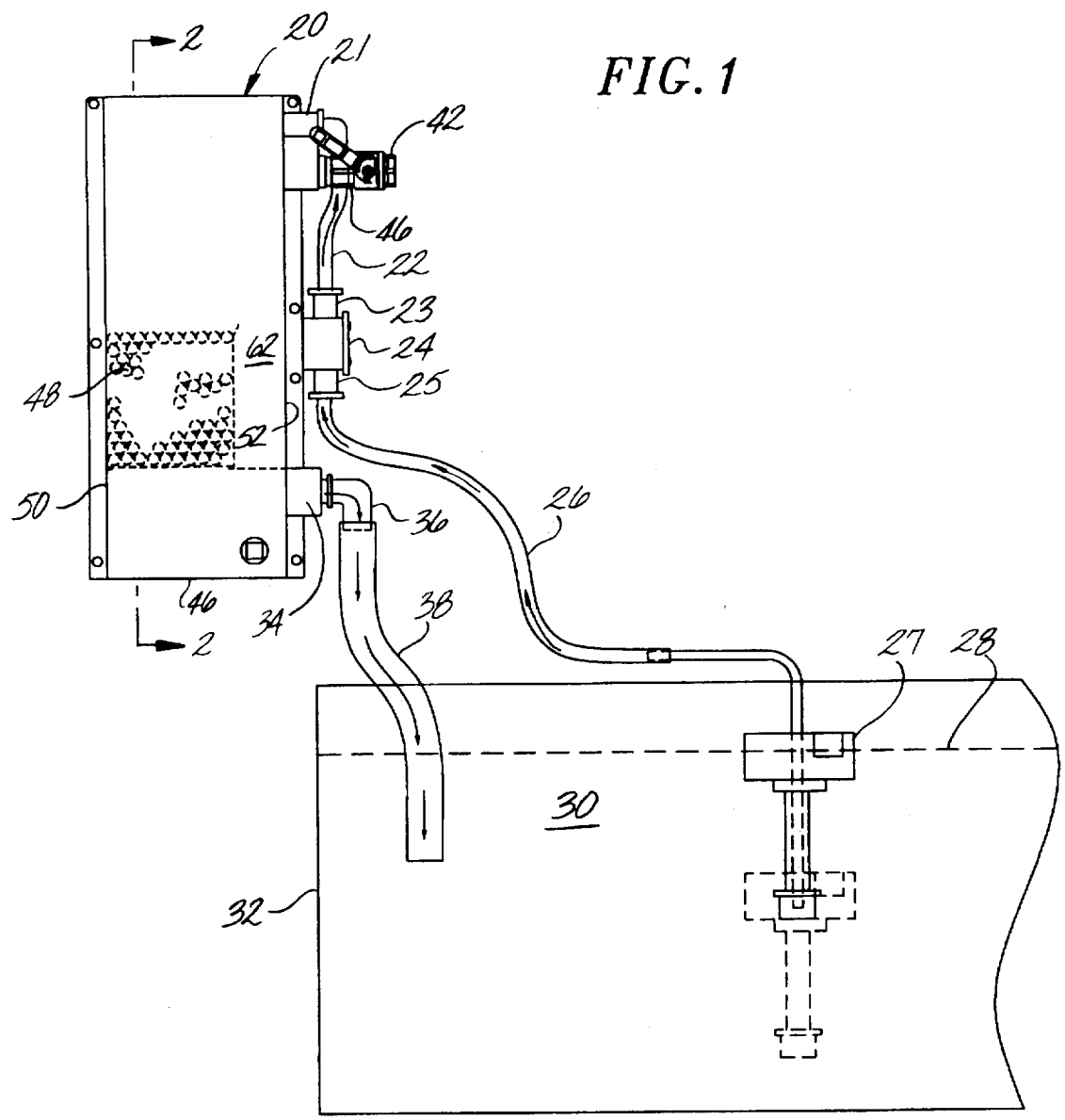
FIG. 1 is a front elevation, partly broken away, of the separator of this invention connected to withdraw a mixture of oil and water from a sump and return separated water to the sump.

A water discharge coupling 34 in a lower portion of the container is connected through an elbow 36 and a drain hose 38 to return separated water to the sump tank.

Oil separated from the mixture in the container is discharged through an oil outlet 40, which includes a ball valve 42, which may be of a conventional type.

Figure 2:
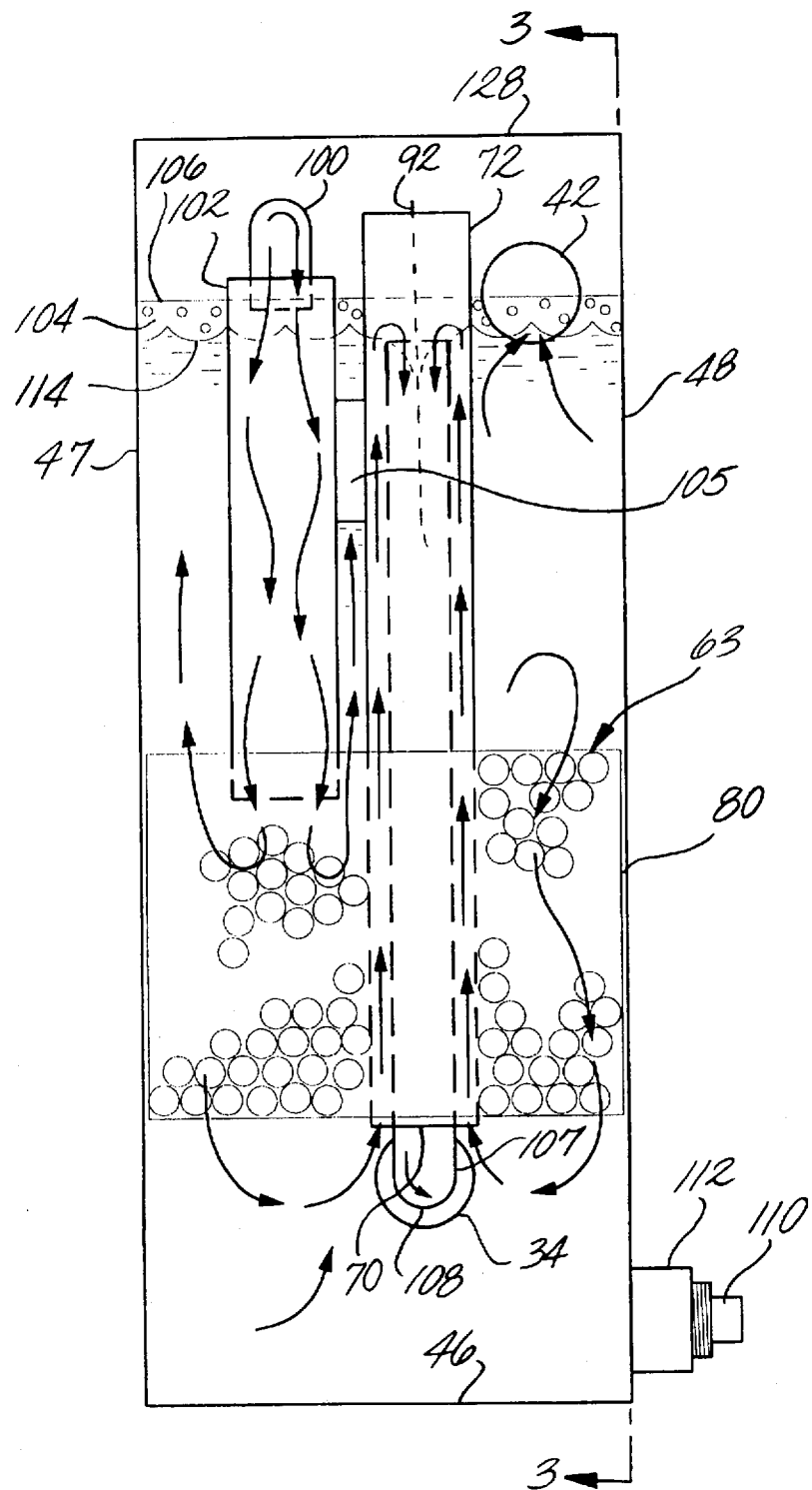
FIG. 2 is a view taken on line 2—2 of FIG. 1.
Figure 3:
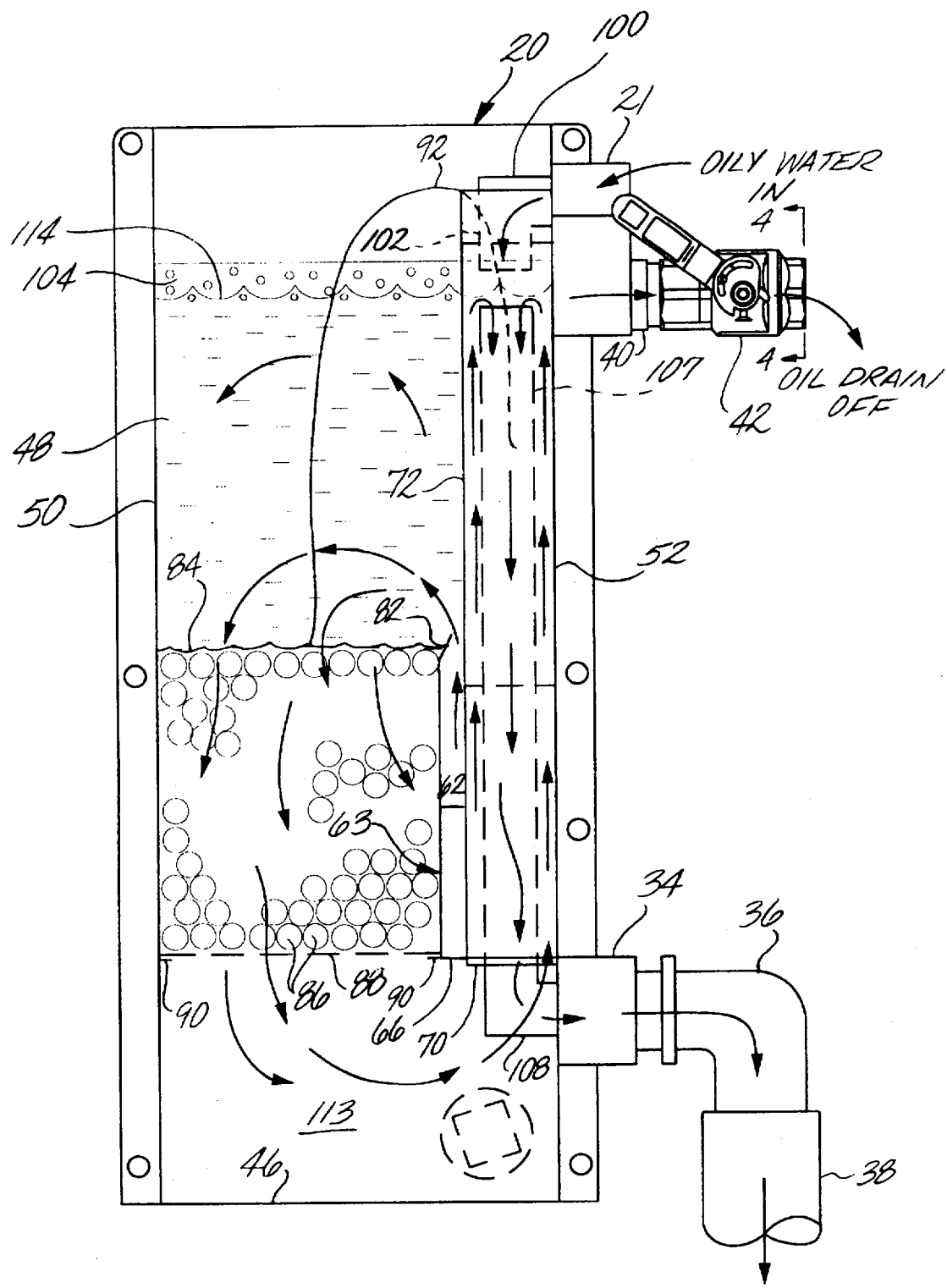
FIG. 3 is a view taken on line 3—3 of FIG. 2.

Referring to FIGS. 1, 2, and 3, the container includes a horizontal bottom wall 46, a vertical, flat back wall 47 formed integrally along its lower edge with the rear edge of the bottom wall, and vertical front, left, and right walls 48, 50, and 52, respectively, each of which are welded at their respective lower edges to the top surface of the bottom wall to form the container 20. The front and back walls are parallel to each other and are the same height. The left and front walls are parallel to each other, the same height as, and perpendicular to, the front and back walls.

As shown best in FIG. 7, the bottom and back walls 46, 47, respectively, are preferably formed from a rectangular piece of sheet metal bent so the lower edge of the back wall and the back edge of the bottom wall are integral. As shown in FIG. 8, the front, left, and right walls 48, 50, and 52, respectively, are formed from a square piece of sheet metal bent so the respective front vertical edges of the left and right walls are each integral with a respective vertical edge on opposite sides of the front wall. The container may be of any suitable dimension. In one useful version, the container is about 20 inches high, the side walls are about 6 inches from front to back, and the back and front walls are about 8 inches wide.

The container is assembled by placing the lower edges of the front, left, and right walls on the top surface of the bottom wall, and so the rear vertical edges of the left and right walls abut the inside surface of the vertical back wall. The front, left, and right walls are substantially the same height as the back wall. However, the bottom edges of the left and right walls are slightly shorter than the left and right edges of the bottom wall, and the bottom edge of the front wall is slightly shorter than the bottom edge of the back wall so that when the front, left, and right walls are centered against the bottom and rear walls, contacts of the respective edges and surfaces are made along the dotted lines 54 shown in FIG. 7. The walls are then welded together along those dotted lines to leave outwardly extending flanges 56 formed integrally with the left and right edges of the back wall, and coplanar with that wall. Outwardly extending flanges 58 are formed integrally with the left and right edges of the bottom wall, and an outwardly extending flange 60 is formed integrally with the front edge of the bottom wall. The bottom wall flanges 58 and 60 are coplanar with the bottom wall. A series of longitudinally spaced mounting holes 61 through each of the flanges facilitate mounting the separator container on any convenient flat surface.

Referring to FIGS. 2, 3, and 6, a submerged trough 62 in the container includes an L-shaped bracket 63 with a vertical bracket wall 64 and an elongated horizontal bracket flange 66 formed integrally along the lower edge of the vertical wall 64. A circular hole 68 opens through the flange 66 to receive the lower end 70 of a vertical riser pipe 72. The lower end of the riser pipe is welded around its outer circumference to the bracket flange 66 around hole 68 to provide a watertight seal.

The L-shaped bracket is disposed in the container adjacent the right side wall and so the vertical bracket wall 64 is spaced from and parallel to the right wall. The right (as viewed in FIGS. 3 and 6) edge 74 of the bracket flange is welded to the inside face of the right wall just above the water return line 34 to form the trough 62, which is submerged in the liquid in the container. In a presently preferred embodiment of the invention, the length of the flange along the edge formed integrally with the vertical wall 64 is slightly less than the inside dimension of the container from the front to the back wall, and the back edges of the bracket flange 66 and vertical wall 64 are welded to the inside face of the back wall of the container, leaving a slight vertical gap 80 (FIG. 2) between the front edge of the L-shaped bracket and the inside face of the front wall. Alternatively, the L-shaped bracket can be dimensioned so that the respective front edges of the vertical wall 64 and flange 66 are welded against the inside face of the front wall. As shown best in FIG. 3, the trough is relatively deep and narrow.

The upper edge of the L-shaped bracket vertical wall is bent at an angle of about 30° from the vertical to form an inclined lip 82, which extends upwardly toward the right wall to facilitate the insertion and removal of a flexible bag 84 of loose marbles 86, which rests on a horizontal support screen 88 carried by inwardly extending horizontal brackets 90 secured to the inner face of the left wall and the lower inner edge of the L-shaped bracket. A drawstring 92 around the upper end of the bag facilitates lifting the bag of marbles into and out of the separator. The marbles provide a coalescing medium for the mixture of oil and water which flows down through the marbles, as described in more detail below. The bag can be of any suitable open-mesh, permeable material, such as nylon or polyethylene netting, or the like. The marbles can be of any suitable material, such as glass, or of a high-density organic material, which has a density greater than water, and which is preferentially wet by oil droplets.

The pump 24 delivers a mixture of oil and water into the top of the container through the inlet line 21 and an inlet elbow fitting 100 welded in an opening (not shown) near the upper back edge of the right (as viewed in FIG. 3) wall of the container. The mixture drops from the lower end of the inlet elbow fitting 100 into the open upper end of a vertical delivery pipe 102, which extends from above the upper surface of a layer 104 of oil down almost to the midpoint of the container, and into the upper portion of the back end of the trough 62 so that the mixture of oil and water flows into the upper portion of the trough to spread from the back toward the front of the container. The delivery pipe is secured to the riser pipe by a shim 105 welded to adjacent surfaces of those two pipes. The mixture fills the trough and the container to the operating level 106 shown in FIGS. 2 and 3. After the container is filled, the incoming mixture flows gently and slowly over the upper edge of the lip 82 from the right to the left (as viewed in FIG. 3) side of the container. Thus, a gentle, slow flow of oil and water mixture is supplied across the top surface of the pile of loose marbles resting on the support screen 88. The larger oil drops in the mixture rise to the surface to form the layer 104 of oil. The mixture of water and smaller oil drops flows down through the pile of marbles, and small drops of oil coalesce on the marbles and in the interstices between adjacent marbles. The coalesced oil drops float to the upper portion of the container to join the layer 104 of oil floating on the surface of the mixture of oil and water in the container.

Water which passes down through the marbles flows up the riser tube, which extends a substantial distance above the upper layer of the oil (but well below the upper end of the container), and down into the open upper end of a vertical drain pipe 107 disposed coaxially within, and spaced from, the riser pipe to leave an annular space between the two pipes. The lower end of the drain pipe is threaded into a return elbow fitting 108 welded through an opening (not shown) in the lower portion of the right wall of the container. The return elbow 108 is connected through coupling 34 and elbow 36 to the water discharge line 38 to return separated water to the sump.

A drain plug 110 is threaded into a horizontal drain fitting 112 welded in a suitable opening (not shown) in the front wall adjacent the container bottom. Thus, a sediment collection zone 113 is formed between the bottom of the screen 88 and the bottom wall 46 of the container. Solid particles which settle out in the sediment zone can be removed as required through the drain fitting 112.

Figure 4:
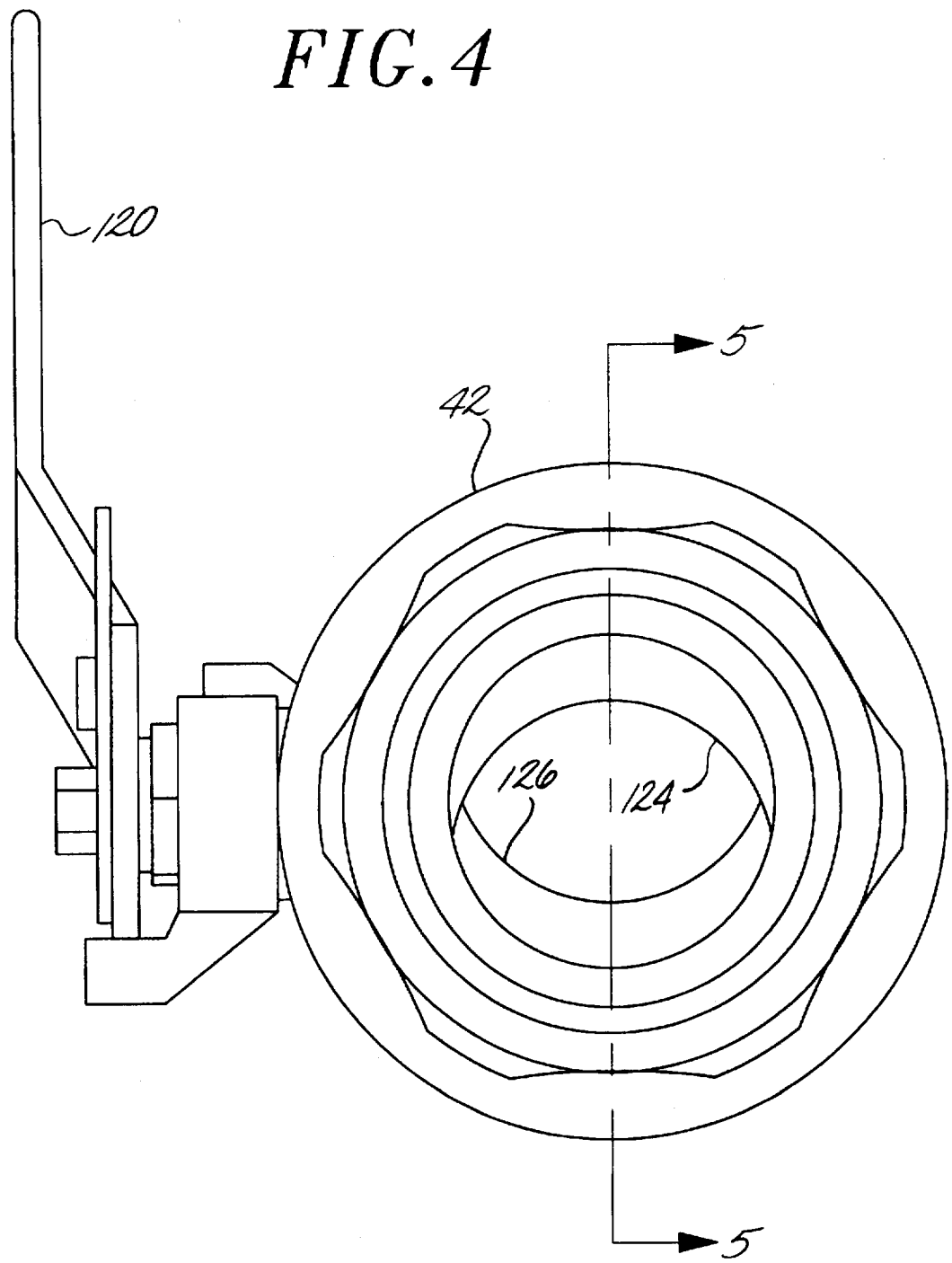
FIG. 4 is a view taken on line 4—4 of FIG. 3.
Figure 5:
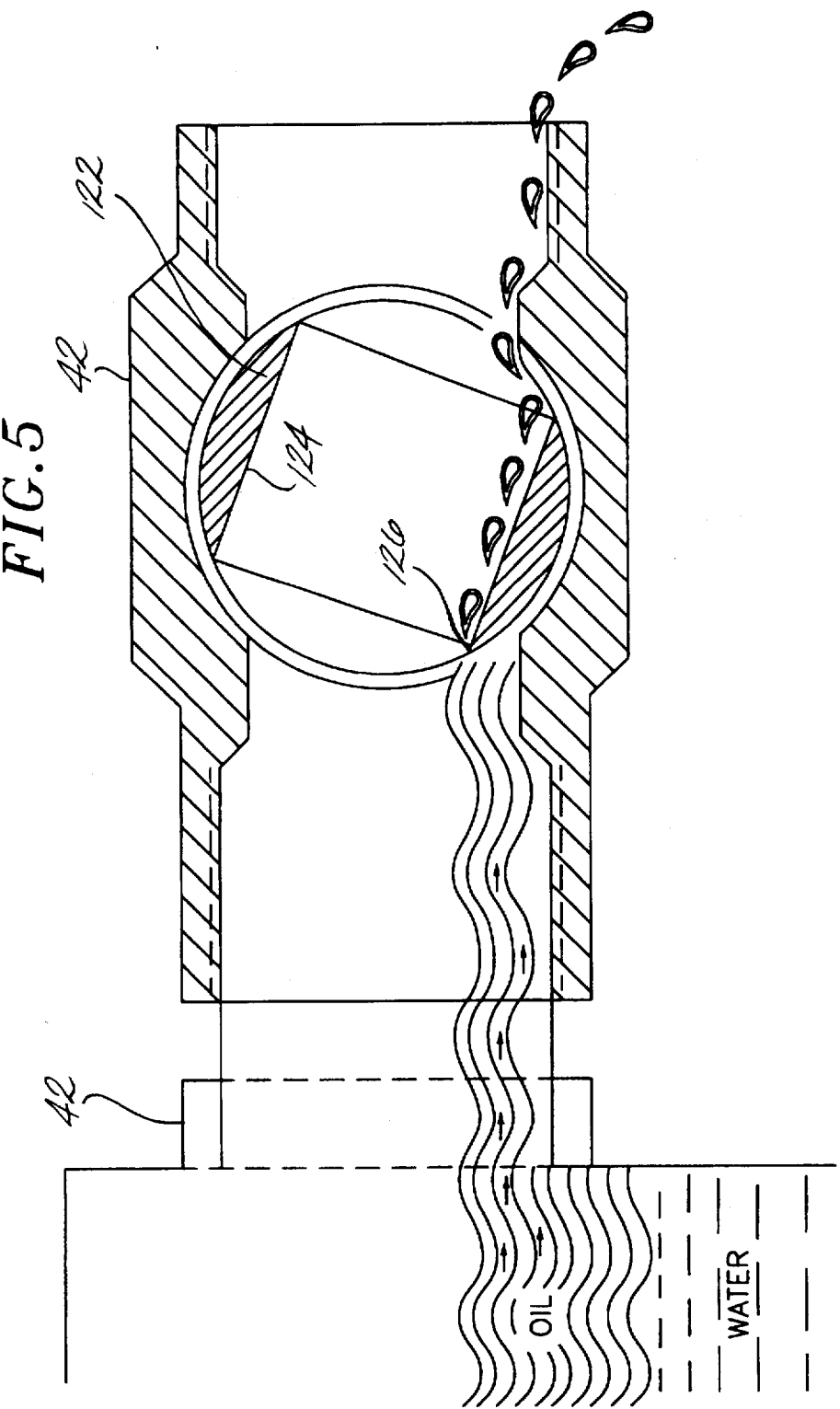
FIG. 5 is a view taken on line 5—5 of FIG. 4.

The upper end of the drain pipe is located at about the same level as an interface 114 between the layer of oil and the mixture of water and oil in the upper portion of the container. The oil outlet 40 is located so the top surface of the oil layer during normal operation is at about the midpoint of the oil drain line. As shown best in FIG. 5, the ball valve 42 includes a handle 120 connected to a ball 122 within the ball valve 42. The handle is adjusted to turn the ball so that a circular orifice 124 opening through the ball provides a weir 126 to control the flow of oil by gravity through the ball valve and to an oil collection center (not shown) so the oil can be stored for removal and recycling. As shown best in FIG. 4, the upper edge of the weir is curved concave upwardly to present an increasing area for overflow of the oil as the oil level rises. The ball valve provides an inexpensive, convenient way to adjust the effective height of the oil overflow weir 126 to provide for careful and efficient decanting of oil from the container. As operating conditions (for example, flow rate, temperature, or relative densities of the mixed liquids) change, the ball valve can easily be adjusted to compensate for those changes and provide the optimum weir setting for efficient separation.

In operation, the self-priming pump 24 is turned on to supply a mixture of oil and water to the open upper end of the delivery pipe. The open connection between the discharge end of the supply elbow 100 and the upper end of the delivery pipe 102 provides a vacuum breaker effect to prevent inadvertent siphoning of liquid from the container in case of pump malfunction, or the like. The open connection also permits entrained air bubbles to work their way out of the incoming mixture and leave by way of the upper end of delivery pipe 102 without disturbing the oil layer.

The mixture of oil and water flows down the delivery pipe and into the upper and back end of the trough. The incoming mixture spreads along the length of the trough to flow slowly and gently over the upper edge of the lip 82 and across the top surface of the pile of marbles. Some of the larger oil droplets float upwardly in the layer of oil/water mixture in the upper part of the container and accumulate in the oil layer. The separated oil flows out the oil outlet at a rate determined by the setting of the ball valve.

The water/oil mixture with the smaller oil droplets flows down through the marbles, where the smaller oil droplets coalesce and work their way up to the oil layer. Separated water flows down through the loose marbles, the supporting screen 88, up the annular space between the interior of the riser pipe and the exterior of the drain pipe, over the top of the drain pipe, and down out the water outlet to be returned to the sump.

If the pile of marbles becomes plugged, the liquid level in the container rises until liquid flows into the open upper end of the riser pipe, and is then discharged out the water return line and into the sump without overflowing the top of the container, which could result in an expensive and even dangerous waste disposal problem.

The upper end of the container is covered by a loose fitting cover 128, which can be lifted from time to time to ensure correct operation of the separator. If the pile of marbles becomes plugged, the bag is lifted by using the drawstring 92, which conveniently can be stored by draping it over the upper edge of the riser pipe 72 to extend down into the drain pipe. The marbles in the bag can be cleaned without removing them from the bag by simply dunking them in a water solution of detergent as many times as necessary to remove the plugging material. Thereafter, the pile of marbles can be replaced to the position shown in FIGS. 2 and 3 by lowering the bag into the container. The flexible bag permits the marbles to settle so as to fit snugly over the bottom of the screen and against the baffle vertical wall and the left, front, and back walls. The inclined lip 82 facilitates entry of the bag into the proper resting position on the support screen 88. The drawstring for the bag can then be draped over the upper edge of the riser pipe and down into the drain pipe. Thus, the pile of loose marbles provides a simple, inexpensive, but very effective coalescing medium for removing small drops of oil from the mixture. This permits the separator to be relatively small. The holes in the mounting flanges on the container permit the separator to be secured to any convenient flat surface, such as the wall of a parts washer, or even the exterior of the wall of the sump tank.

I claim:

1. A separator for a mixture of two liquids of different density the separator comprising:
    a) a container for holding the mixture, which separates by gravity into a layer of lighter liquid on a layer of heavier liquid in the container;
    b) a delivery pipe extending from above the layer of lighter liquid down into the heavier liquid;
    c) means for supplying the mixture to an upper portion of the delivery pipe, so the mixture flows down the delivery pipe into the container;
    d) a first outlet for removing the lighter liquid from the container;
    e) a second outlet for removing the heavier liquid from the container;
    f) an upwardly extending drain pipe connected at its lower end to the second outlet, the upper end of the drain pipe being in the vicinity of the interface between the two layers;
    g) a riser pipe disposed around and spaced from the drain pipe, the upper end of the riser pipe being above the level of the layer of lighter liquid, the lower end of the riser pipe being open and in the layer of heavier liquid so the heavier liquid can flow up between the drain and riser pipes and down into the upper end of the drain pipe;
    h) a pile of loose coalescing elements in the container between the delivery pipe and the lower end of the riser pipe so at least the heavier liquid flows through the pile;
    i) a ball valve in the first outlet for setting the level of the lighter liquid flowing out the first outlet, the ball valve including a ball with a substantially circular orifice extending through the ball, the ball being disposed at substantially the same level as the interface between the two layers;
    j) means for rotating the ball to cause the orifice to form an adjustable weir with an upper edge slightly above the interface between the two layers; and
    K) at least one outwardly extending flange on the container to facilitate mounting the separator in a workspace.

2. A separator for a mixture of two liquids of different densities, the separator comprising:
    a) a container for holding a mixture of the two liquids and a layer of the lighter liquid on the mixture;
    b) an inlet for supplying the mixture to the container where the mixture separates by gravity into a layer of lighter liquid on a layer of heavier liquid;
    c) a first outlet for removing the lighter liquid from the container;
    d) a second outlet for removing the heavier liquid from the container;

e) an upwardly extending drain pipe connected at its lower end to the second outlet, the upper end of the drain pipe being in the vicinity of the interface between the two layers;

f) a ball valve in the first outlet for controlling the flow of the lighter liquid from the container, the ball valve including a ball with a substantially circular orifice extending through the ball, the ball being disposed at substantially the same level as the interface between the two layers; and g) means for rotating the ball to cause the orifice to form an adjustable weir with an upper edge slightly above the interface between the two layers.

3. A separator according to claim 2 which includes at least one outwardly extending flange on the container to facilitate mounting the separator in a workspace.

4. A separator according to claim 3 which includes mounting holes extending through the flange.

5. A separator according to claim 2 which includes a permeable pile of loose coalescing elements in the container between the inlet and the second outlet so at least the heavier liquid flows through the pile.

6. A separator according to claim 5 in which the pile of loose coalescing elements is a group of marbles in a permeable bag.

7. A separator according to claim 2 which includes a delivery pipe extending from the inlet down through the layer of lighter liquid and into the mixture of the two liquids in the container, the upper end of the delivery pipe being open and disposed to receive the mixture from the inlet.

8. A separator according to claim 2 in which the upper edge of the weir is curved concave upwardly to present an increasing area for overflow of the lighter liquid as the level of the lighter liquid rises.

9. A separator for a mixture of two liquids of different densities, the separator comprising:

a) a container for holding a mixture of the two liquids and a layer of the lighter liquid on the mixture;

b) an inlet for supplying the mixture to the container where the mixture separates by gravity into a layer of lighter liquid on a layer of heavier liquid;

c) a first outlet for removing the lighter liquid from the container;

d) a second outlet for removing the heavier liquid from the container;

e) a permeable and removable enclosure in the container between the container inlet and the container second outlet so at least the heavier liquid flows through the enclosure;

f) a pile of loose coalescing elements in the enclosure;

(g) a ball valve in the first outlet for controlling the flow of the lighter liquid from the container, the ball valve including a ball with a substantially circular orifice extending through the ball, the ball being disposed at substantially the same level as the interface between the two layers; and (h) means for rotating the ball to cause the orifice to form an adjustable weir with an upper edge slightly above the interface between the two layers.

10. A separator according to claim 9 in which the pile of loose coalescing elements is a plurality of marbles, and the enclosure is a permeable bag.

* * * * *